United States Patent
Hofbauer (10) Patent No.: US 12,208,431 B2
(45) Date of Patent: Jan. 28, 2025

(54) PROCESSING METHOD AND PLANT FOR WELDING METAL STRIPS

(71) Applicant: Primetals Technologies Germany GmbH, Erlangen (DE)

(72) Inventor: Josef Hofbauer, Erlangen (DE)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 117 days.

(21) Appl. No.: 18/012,185

(22) PCT Filed: Jun. 30, 2021

(86) PCT No.: PCT/EP2021/068051
§ 371 (c)(1),
(2) Date: Dec. 21, 2022

(87) PCT Pub. No.: WO2022/008317
PCT Pub. Date: Jan. 13, 2022

(65) Prior Publication Data
US 2023/0330728 A1    Oct. 19, 2023

(30) Foreign Application Priority Data
Jul. 6, 2020   (EP) ..................................... 20184277

(51) Int. Cl.
*B21B 15/00*    (2006.01)
*B21B 39/02*    (2006.01)
(Continued)

(52) U.S. Cl.
CPC .......... *B21B 15/0085* (2013.01); *B21B 39/02* (2013.01); *B23K 26/24* (2013.01); *B23K 2101/16* (2018.08)

(58) Field of Classification Search
None
See application file for complete search history.

(56) References Cited

U.S. PATENT DOCUMENTS 5,515,707 A * 5/1996 Smith .................... B21C 37/30
                                                            72/53
5,662,145 A * 9/1997 Stagg .................. B21C 37/0826
                                                            138/171
(Continued)

FOREIGN PATENT DOCUMENTS

DE       19843382 A1     3/2000
DE    102004018600 A1   11/2005
(Continued)

OTHER PUBLICATIONS

International Search Report mailed Nov. 4, 2021 in corresponding PCT International Application No. PCT/EP2021/068051.
(Continued)

*Primary Examiner* — Devang R Patel
(74) *Attorney, Agent, or Firm* — OSTROLENK FABER LLP (57) ABSTRACT

A processing plant for metal strips (1) has a welding machine, a strip store downstream of the welding machine and a processing device downstream of the strip store. The metal strips are welded to form a continuous strip with the welding machine, which is stored in the strip store and output from there to the processing device. The metal strips are connected via diagonally extending weld seams. To join the weld seams, first the strip head (2) and the strip foot (3) of the metal strips are twisted and the two strips are connected by forming the weld seam. The weld seam extends only transversely to the transport direction (x) during the welding process. Finally, the strip head and the strip foot of the metal strips are twisted back again. As a result, the weld seam now extends diagonally to the transport direction (x).

6 Claims, 3 Drawing Sheets

(51) Int. Cl.
*B23K 26/24* (2014.01)
*B23K 101/16* (2006.01)

(56) References Cited

U.S. PATENT DOCUMENTS

| | | | | |
|---|---|---|---|---|
| 6,161,751 A | * | 12/2000 | Smith | B23K 9/0203 |
| | | | | 228/199 |
| 2002/0175148 A1 | | 11/2002 | Meyer et al. | |
| 2010/0051590 A1 | | 3/2010 | Zheng | 219/104 |
| 2018/0147619 A1 | | 5/2018 | Tsukamoto et al. | |

FOREIGN PATENT DOCUMENTS

| | | | | |
|---|---|---|---|---|
| EP | 1260301 A2 | | 11/2002 | |
| EP | 1260301 A3 | | 5/2004 | |
| EP | 3006122 A1 | * | 4/2016 | ............ B21B 1/36 |
| EP | 3208005 A1 | * | 8/2017 | ............ B21B 1/22 |
| JP | S49-003385 A | | 1/1974 | |
| JP | H01-205872 A | | 8/1989 | |
| JP | H03-114685 A | | 5/1991 | |
| JP | H05-096398 A | | 4/1993 | |
| JP | H07178417 A | | 7/1995 | |
| JP | H08-309403 A | | 11/1996 | |
| JP | H09-225503 A | | 9/1997 | |

OTHER PUBLICATIONS

Office Action dated Apr. 30, 2024 issued in corresponding Japanese Patent Application No. 2023-500406. English translation attached.

* cited by examiner

PROCESSING METHOD AND PLANT FOR WELDING METAL STRIPS

CROSS-REFERENCE TO RELATED APPLICATIONS

The present application is a 35 U.S.C. §§ 371 national stage application of International Application No. PCT/EP2021/068051, filed Jun. 30, 2021, which claims priority to European Patent Application No. EP20184277, filed Jul. 6, 2020, the contents of which are incorporated herein by reference.

TECHNICAL FIELD

The present invention starts from a processing method for metal strips,
  wherein a metal strip is in each case fed to a strip accumulator of a processing plant for the metal strips intermittently and sequentially in succession in a transport direction that is uniform for the metal strips,
  wherein the respective metal strip has a respective strip head, a respective strip tail and a respective fillet piece between the respective strip head and the respective strip tail,
  wherein the respective metal strip enters the strip accumulator first with the respective strip head, then the respective fillet piece and finally the respective strip tail,
  wherein the respective strip head has a respective leading edge and the respective strip tail has a respective trailing edge,
  wherein, immediately before the respective metal strip is fed to the strip accumulator, the respective leading edge is welded by means of a welding machine of the processing plant to the trailing edge of a metal strip which has in each case been partially fed to the strip accumulator immediately beforehand, with the result that a respective weld seam is formed between the leading edge of the respective metal strip and the trailing edge of the metal strip which has in each case been partially fed in immediately beforehand,
  wherein, when viewed transversely to the transport direction, the respective weld seam extends from a lateral edge, running in the transport direction, of one of the two metal strips involved to the other lateral edge of the same metal strip or to a lateral edge of the other metal strip,
  wherein the metal strips stored in the strip accumulator, including the weld seams connecting the metal strips, are fed continuously or intermittently from the strip accumulator to a processing device of the processing plant,
  wherein in each case first the strip head, then the fillet piece and only then the strip tail of the respective metal strip are fed to the processing device.

The present invention furthermore starts from a processing plant for metal strips,
  wherein the processing plant has a strip accumulator, to which a metal strip is in each case fed intermittently and sequentially in succession in a transport direction that is uniform for the metal strips,
  wherein the respective metal strip has a respective strip head, a respective strip tail and a respective fillet piece between the respective strip head and the respective strip tail,
  wherein the respective metal strip enters the strip accumulator first with the respective strip head, then the respective fillet piece and finally the respective strip tail,
  wherein the respective strip head has a respective leading edge and the respective strip tail has a respective trailing edge,
  wherein the processing plant has a welding machine, which is arranged upstream of the strip accumulator and by means of which, immediately before the respective metal strip is fed to the strip accumulator, the leading edge of the respective metal strip is welded to the trailing edge of a metal strip which has in each case been partially fed to the strip accumulator immediately beforehand, with the result that a respective weld seam is formed between the leading edge of the respective metal strip and the trailing edge of the metal strip which has in each case been partially fed in immediately beforehand,
  wherein, when viewed transversely to the transport direction, the respective weld seam extends from a lateral edge, running in the transport direction, of one of the two metal strips involved to the other lateral edge of the same metal strip or to a lateral edge of the other metal strip,
  wherein the metal strips stored in the strip accumulator, including the weld seams connecting the metal strips, are fed continuously or intermittently from the strip accumulator to a processing device of the processing plant,
  wherein in each case first the strip head, then the fillet piece and only then the strip tail of the respective metal strip are fed to the processing device.

A processing method of this kind for metal strips and also the associated processing plant are known from DE 198 43 282 A1, for example.

In particular, the metal strip can consist of steel or aluminum. However, other metals and alloys are also possible. The processing device can comprise a pickling unit, a stretcher leveler or a rolling mill, in particular a cold rolling mill. It is also possible for a plurality of these components to be present, in particular even all the components. If a plurality of components is present, the metal strips pass through these sequentially in succession.

It is possible for the respective metal strip to be fed to the strip accumulator from an uncoiler. In this case, the respective metal strip is inserted as a coil into the uncoiler and is then uncoiled. If appropriate, a further strip accumulator can be arranged between the uncoiler and the welding machine. However, neither the uncoiler nor the further strip accumulator are absolutely necessary.

PRIOR ART

In many cases, processing devices for metal strips are operated continuously. In this context, continuous operation means that a continuous strip is fed to the respective processing device, with the result that each of the components of the processing device continuously processes one section of the continuous strip. Such modes of operation are known, for example, for pickling units, stretcher levelers and rolling mills (particularly cold rolling mills). In order to produce the continuous strip, individual, discrete metal strips are in many cases butted up against one another, i.e. the strip head of one metal strip is placed against the strip tail of the preceding metal strip. The metal strips can consist of the same material (for example a steel having a chemical composition which is uniform for the metal strips) or of materials which are different from one another (for example steels having chemical compositions which are different from one another). The dimensions, that is to say the strip widths and the strip thicknesses, can also be identical to or different from one another.

The metal strips are connected to one another by means of a respective weld seam, which is produced by means of a welding machine. During the welding operation, the corresponding strip head and the corresponding strip tail are not fed forward. For this reason, a strip accumulator is arranged between the welding machine and the processing device. A variable length of the continuous strip can be stored and buffered in the strip accumulator. In particular, the speed at which the continuous strip runs out of the strip accumulator can be set independently of the speed at which the continuous strip runs into the strip accumulator. If the speeds are different, then, of course, the degree to which the accumulator is filled changes. When considered over longer periods of time, the entry speed and the exit speed must therefore be the same on average since otherwise the strip accumulator would either run empty or overflow. However, short-term differences in the speeds can be compensated for by the strip accumulator.

The corresponding embodiments of the processing device, the welding machine and the strip accumulator, as well as their modes of operation, are common knowledge among those skilled in the art.

As the continuous strip passes through the processing device, the weld seams also pass through the processing device. The weld seams often represent weak points of the continuous strip. In the case of stretcher levelers, there is, for example, the risk that the continuous strip will break while a weld seam is passing through the stretcher leveler. In the case of roll stands, there is an even greater risk that the continuous strip will tear while a weld seam is passing through the roll gap of the corresponding roll stand. Admittedly, this risk can be reduced by producing high-quality weld seams. However, a high degree of process know-how and high-quality maintenance of the welding machine are required. Especially at the end of a production cycle (for example before a maintenance shutdown), this quality cannot always be fully maintained. Moreover, there is often a need to weld materials which can be welded to one another only with difficulty. In the case of such materials, there is a particularly high risk of strip tearing.

In order to minimize the risk of strip tearing in the region of the weld seams, particularly in rolling mills, the transition sections from one metal strip to the other, that is to say the respective weld seam and the regions some way in front and some way behind, are rolled in a special manner, for example with lower rolling forces and smaller pass reductions. However, owing to the different manner of rolling, the transition sections have different properties than the other regions of the metal strips. This can involve both geometric properties (for example the strip thickness) and mechanical properties (for example the tensile strength, the yield strength and the yield point). Therefore, the corresponding transition sections are often unusable and instead represent scrap.

EP 1 260 301 A2 discloses connecting two metal strips by means of a diagonally extending weld seam. Angles of 15° to 45° to the longitudinal direction of the metal strip are mentioned. The processing device is a tube-forming device.

US 2010/0 051 590 A1 discloses connecting two metal strips by means of a diagonally extending weld seam. The angle at which the weld seam extends is selected in such a way that the longitudinal extent of the weld seam is greater than the compressed length during a subsequent rolling operation.

JP H07 178 417 A discloses connecting two metal strips by means of a weld seam. The weld seam can run diagonally or in a zigzag manner. The angle which the weld seam forms with the transport direction is at least 30°.

SUMMARY OF THE INVENTION

It is the object of the present invention to provide possibilities by means of which the risk of strip tearing can be minimized and nevertheless the amount of scrap produced can be kept as small as possible, particularly during rolling operations. Furthermore, it should be possible to retrofit conventional welding machines, by means of which it is only possible to form a weld seam orthogonally to the transport direction, in such a way that they can produce a diagonal profile of the weld seam 14.

The object is achieved by a processing method for metal strips as claimed. Advantageous refinements of the processing method form the subject matter of dependent claims.

According to the invention, a processing method of the type mentioned at the outset is refined by operating the welding machine in such a way that,
  before the leading edge of the respective metal strip is welded to the trailing edge of the metal strip partially fed to the strip accumulator, the strip head of the respective metal strip and the strip tail of the metal strip partially fed to the strip accumulator are slightly rotated,
  the two strips are then connected to one another by forming the weld seam, wherein, during welding as such, the weld seam runs exclusively transversely to the transport direction, and
  finally, the strip head of the respective metal strip and the strip tail of the metal strip partially fed to the strip accumulator are rotated back again, with the result that, after the rotation of the metal strips, which are then welded to one another, the weld seam runs diagonally with respect to the transport direction.

As a result, the respective weld seam no longer runs initially into the processing device at the same time over its entire width and is no longer subjected there to processing at the same time; instead, different sections of the respective weld seam run into the processing device successively in time and are subjected there successively to processing. At any one point in time, therefore, only part of the respective weld seam is being subjected to stress by the processing operation. In a rolling process, for example, only the corresponding part of the respective weld seam is being deformed at any one point in time. That section of the respective weld seam which is being subjected to processing at a particular time is thus flanked on at least one side, as a rule indeed on both sides, by the material of one or the other metal strip. Loads can therefore be absorbed by one and/or the other metal strip. Only a small part of the load acts directly on the respective weld seam. The line stress on the respective weld seam can thus be significantly reduced. Furthermore, the extent of brief disturbances produced by the processing of the respective weld seam can be significantly reduced on account of the prolongation of the time involved in processing the respective weld seam. The stability of the processing operation can thereby be increased. Finally, the manner in which the diagonal weld seam is produced can also be applied retrospectively in an existing conventional welding machine.

The respective leading edge is prepared for welding to the end of the preceding metal strip. This can be accomplished, in particular, by preparing the profile of the respective leading edge, so that the profile of the respective leading edge corresponds to the profile of the trailing edge of the respectively preceding metal strip. This profile corresponds to the later profile of the respective weld seam. The preparation can be cropping by means of shears, for example. The strip tail can also be prepared in an analogous manner. In many cases, preparation is performed by means of a laser, which cuts off a small piece of the respective metal strip at the strip head, with the result that the leading edge formed by this machining is the leading edge of the respective metal strip. The trailing edge of the respective immediately preceding metal strip is also prepared in an analogous manner. As a rule, the two metal strips involved are moved toward one another immediately before welding, so that they completely or at least almost abut one another. During the welding operation itself, the strip head of one metal strip and the strip tail of the other metal strip are held fixed in the welding machine, being clamped for example.

The welding machine can be operated in such a way, for example, that loops are formed in corresponding regions of the strip head of the respective metal strip and of the strip tail of the metal strip partially fed to the strip accumulator in order to rotate the strip head of the respective metal strip and the strip tail of the metal strip partially fed to the strip accumulator.

In many cases, the processing device is designed as a rolling mill having at least one roll stand. In this case, the metal strips are rolled with a respective compressed length in the roll stands of the processing device.

The term "compressed length" is common parlance among those skilled in the art. When viewed in the transport direction, it designates that region in which the respective metal strip is rolled from its thickness on the inlet side of the respective roll stand to its thickness on the outlet side of the respective roll stand during the respective rolling operation. A longitudinal extent which the respective weld seam has, when viewed in the transport direction, before rolling in the respective roll stand is preferably greater than the respective compressed length. This ensures, in particular, that the entire weld seam is not being subjected to the respective rolling operation at any one time during the rolling of the respective weld seam.

An angle formed by the respective weld seam with the transport direction preferably differs by approximately 5° to 10° from 90°, in particular by 6° to 8°.

As a rule, the compressed length in the first rolling operation is greater or at least not less than the compressed length in the other rolling operations. As a result of the rolling of the metal strips, the longitudinal extent of the respective weld seam is further lengthened during each rolling operation. If the longitudinal extent of the respective weld seam, upstream of the rolling in the first roll stand when viewed in the transport direction, is greater than the respective compressed length during rolling in the first roll stand, this necessarily also applies to the other rolling operations. However, even if this is not the case, that is to say if, for example, the compressed length in the third rolling operation is, by way of exception, greater than the compressed length in the first rolling operation, this is generally not critical. This is explained below by means of an example in which it is assumed that the processing device is designed as a rolling train with, for example, four roll stands. This is because, even if, in such a case, the longitudinal extent of the respective weld seam immediately after the production of the weld seam is less than the compressed length over which the metal strip is rolled, in the second roll stand for example, it is merely necessary to ensure, by the elongation of the metal strip as a result of rolling in the first roll stand, that the longitudinal extent of the respective weld seam is correspondingly increased. The situation is analogous in respect of the rolling in the third and fourth roll stands or, more generally, in any further roll stand.

The object is furthermore achieved by a processing plant for metal strips as claimed. Advantageous refinements of the processing plant form the subject matter of dependent.

According to the invention, a processing plant of the type mentioned at the outset is refined by designing the welding machine in such a way that,
  before the leading edge of the respective metal strip is welded to the trailing edge of the metal strip partially fed to the strip accumulator, the strip head of the respective metal strip and the strip tail of the metal strip partially fed to the strip accumulator are slightly rotated,
  the two strips are then connected to one another by forming the weld seam, wherein, during welding as such, the weld seam runs exclusively transversely to the transport direction, and
  finally, the strip head of the respective metal strip and the strip tail of the metal strip partially fed to the strip accumulator are rotated back again, with the result that, after the rotation of the metal strips, which are then welded to one another, the weld seam runs diagonally with respect to the transport direction.

The term "design of the welding machine" within the meaning of the present invention is to be understood very broadly. The advantages which can be achieved by the design of the welding machine according to the invention correspond to those of the processing method.

The welding machine is preferably designed in such a way that loops are formed in corresponding regions of the strip head of the respective metal strip and of the strip tail of the metal strip partially fed to the strip accumulator in order to rotate the strip head of the respective metal strip and the strip tail of the metal strip partially fed to the strip accumulator. The above statements relating to the processing method are applicable mutatis mutandis.

The processing device is preferably designed as a rolling mill having at least one roll stand.

An angle formed by the respective weld seam with the transport direction preferably differs by approximately 5° to 10° from 90°, in particular by 6° to 8°.

BRIEF DESCRIPTION OF THE DRAWINGS

The above-described properties, features and advantages of this invention and the manner in which these are achieved will become more clearly and distinctly comprehensible in conjunction with the following description of the exemplary embodiments, which are explained in greater detail in combination with the drawings. Here, in schematic illustration.

DESCRIPTION OF THE EMBODIMENTS

Figure 1:
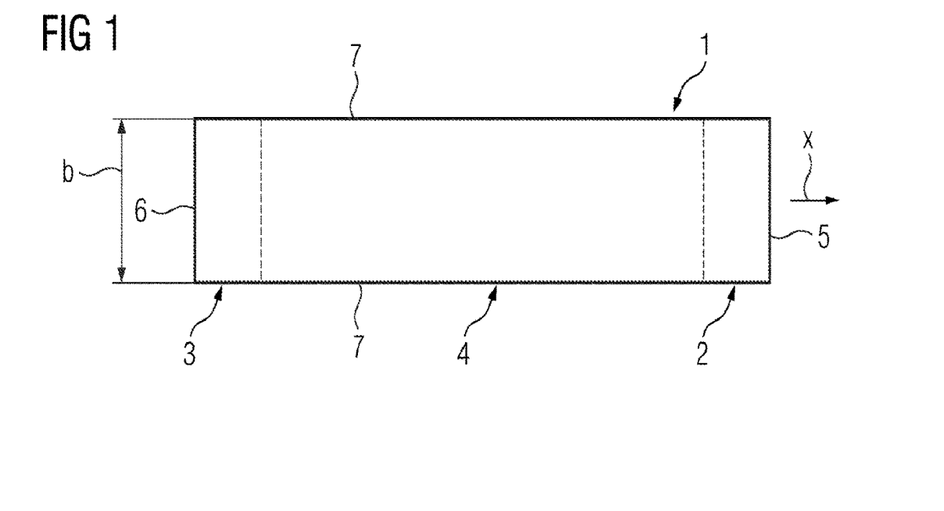
FIG. 1 shows a metal strip.

According to FIG. 1, metal strips 1 are elongate flat rolled products. The metal strips 1 are conveyed in a transport direction x—see also the further FIGURES below. The leading region of the respective metal strip 1 forms what is referred to as the strip head 2, while the trailing region forms what is referred to as the strip tail 3. In between, there is a central region of the respective metal strip 1, referred to as the fillet piece 4. The exact boundaries between the strip head 2 and the fillet piece 4 and between the fillet piece 4 and the strip tail 3—indicated by dashed lines in FIG. 1—are of secondary importance. The respective strip head 2 ends at a respective leading edge 5, and the respective strip tail 3 ends at a respective trailing edge 6. Extending between the respective leading edge 5 and the respective trailing edge 6 are respective lateral edges 7 of the metal strip 1. The lateral edges 7 run parallel to the transport direction x.

In the further FIGURES, the metal strips 1 have a small letter a, b, etc. added as a suffix to enable them to be distinguished from one another, if required, in the course of the description of the present invention. The same applies to the various parts and sections of the metal strips 1, for example the strip heads 2 and the strip tails 3.

Figure 2:
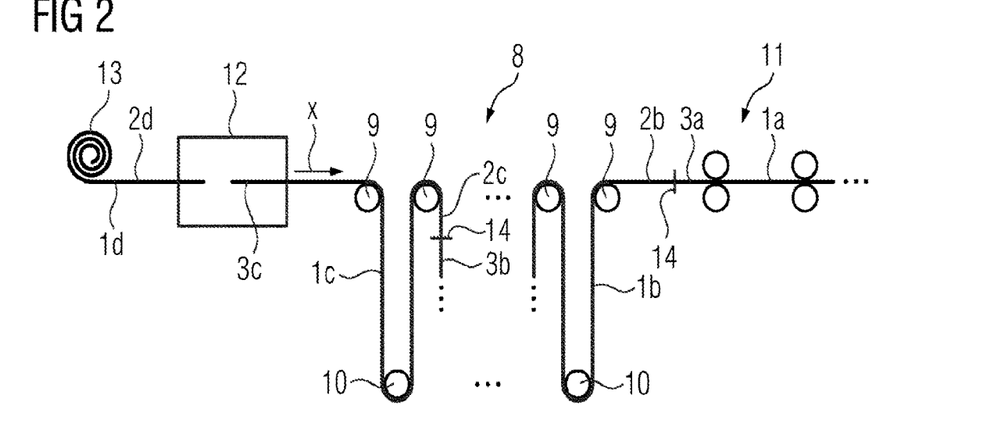
FIGS. 2 to 5 show a processing plant for metal strips in various, chronologically successive operating states.

According to FIG. 2, a processing plant for the metal strips 1 has a strip accumulator 8. According to the illustration in FIG. 2, for example, the strip accumulator 8 can have a number of upper rollers 9 and lower rollers 10, the metal strips 1 in the strip accumulator 8 being guided alternately over one of the upper rollers 9 and one of the lower rollers 10. The upper rollers 9 can, for example, be arranged in a fixed manner, while the lower rollers 10 can be lowered with respect to the upper rollers 9. The quantity of metal strip 1 which is stored in the strip accumulator 2 varies, depending on the extent to which the lower rollers 10 are lowered.

The processing plant furthermore has a processing device 11. According to the illustration in FIG. 1, the processing device 11 can, for example, be designed as a multi-stand rolling train. In this case, as a rule, cold rolling takes place in the rolling train. However, other embodiments of the processing device 11 are also possible, whether in addition to or as an alternative to a rolling train. For example, the processing device 11 can be a pickling unit or can comprise a pickling unit in addition to the rolling train. In the latter case, the pickling unit is arranged upstream of the rolling train. Regardless of its specific configuration, however, the processing device 11 is arranged downstream of the strip accumulator 8.

Finally, the processing plant has a welding machine 12. The welding machine 12 is arranged upstream of the strip accumulator 8.

The processing plant is operated as follows:

At a certain point in time, a certain quantity of metal strip 1 is stored in the strip accumulator 8. For example, in the state according to FIG. 2, with the exception of its strip tail 3*c*, metal strip 1*c*, and the strip tail 3*b* and a majority of the fillet piece 4*b* of metal strip 1*b* are stored. The strip head 2*b* of metal strip 1*b* and metal strip 1*a* have already left the strip accumulator 8. Specifically, the strip head 2*b* of metal strip 1*b* is still being transported to the processing device 11, while metal strip 1*a* is already in the processing device 11 or may already have left the processing device 11.

Figure 3:
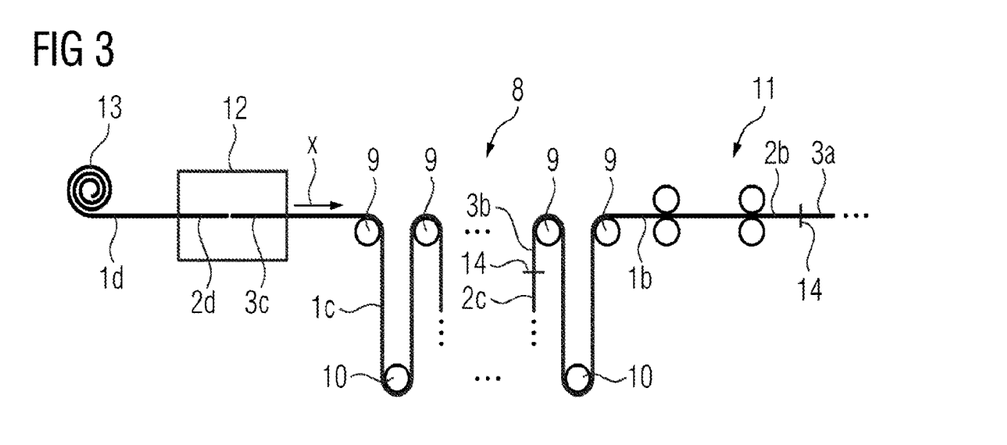

The strip tail 3*c* of metal strip 1*c* is still in the welding machine 12. The strip head 2*d* of metal strip 1*d* is to be applied to the strip tail 3*c* of metal strip 1*c*. For this purpose, the strip head 2*b* of metal strip 1*d* is fed to the welding machine 12. For this purpose, metal strip 1*d* is generally uncoiled to a corresponding extent from a coiler 13. Specifically, uncoiling takes place to such an extent that the strip head 2*d* of metal strip 1*d* is moved within the welding machine 12 into the immediate vicinity of the strip tail 2*c* of metal strip 1*c*. According to the illustration in FIG. 3, the leading edge 5*d* of metal strip 1*d* thus adjoins the trailing edge 6*c* of metal strip 1*c* with an extremely small clearance (at most a few millimeters).

Figure 4:
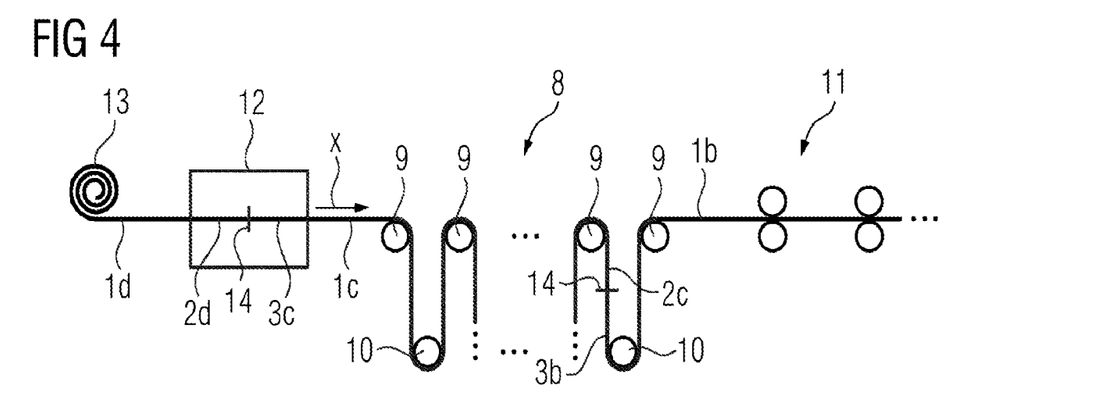
Figure 5:
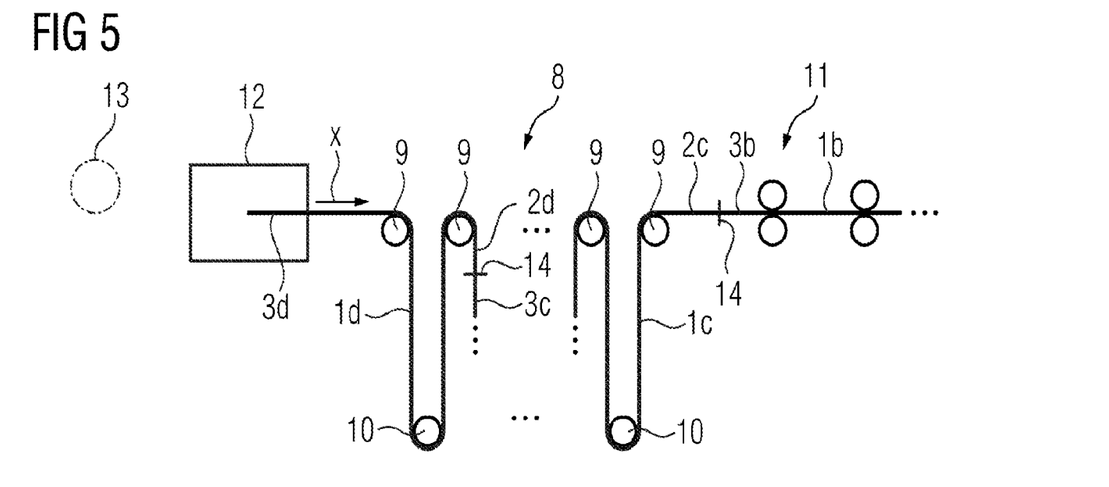

In this state, the leading edge 5*d* of metal strip 1*d* is welded to the trailing edge 6*c* of metal strip 1*c* by means of the welding machine 12. Between these two edges 5*d*, 6*c*, therefore, a weld seam 14 is formed. As a result of the welding, metal strip 1*d* has become a constituent part of a continuous strip which previously comprised only metal strips 1*a*, 1*b* and 1*c*. FIG. 4 shows this state. After welding, the strip tail 3*c* of metal strip 1*c* and the strip head 2*d* and the fillet piece 4*d* of metal strip 1*d* are fed to the strip accumulator 8 in the transport direction x. The feeding of metal strip 1*d* takes place to such an extent that the strip tail 3*d* still remains in the welding machine 12. FIG. 5 shows the corresponding state.

As far as the feeding of the metal strips 1 to the strip accumulator 8 is concerned, a complete cycle is completed by the procedure explained above. This cycle is repeated again and again, and therefore a new metal strip 1 is repeatedly welded to the previous metal strip 1 and fed to the strip accumulator 8. As a result, the metal strips 1 are thus fed intermittently and sequentially in succession to the strip accumulator 8. Furthermore, the transport direction x for the metal strips 1 is—as an entirely natural result—uniform, and each metal strip 1 runs first with its strip head 2, then with its fillet piece 4 and finally with its strip tail 3 into the strip accumulator 8.

The metal strips 1 (or the corresponding sections of the continuous strip) stored in the strip accumulator 8 can be fed to the processing device 11 as required. It is possible in individual cases for feeding to take place intermittently. As a rule, however, it takes place continuously. This too can be seen from FIGS. 2 to 5.

In particular, the weld seams 14 between metal strips 1*a* and 1*b* and metal strips 1*b* and 1*c* in the state according to FIG. 2 are located at specific points and, furthermore, the lower rollers 10 are located at a specific height level, which in turn corresponds to the degree of filling of the strip accumulator 8. A period of time elapses before the strip head 2*d* of metal strip 1*d* is brought up to the strip tail 3*c* of metal strip 1*c*—illustrated in FIG. 3. During this period of time too, as a rule, the continuous strip is conveyed out of the strip accumulator 8 and, in association therewith, the continuous strip is fed to the processing device 11. In comparison with the state illustrated in FIG. 2, however, the location of the strip tail 3*c* has not changed. As a result of the continuous strip being conveyed out of the strip accumulator 8, the degree of filling of the strip accumulator 8 has thus been reduced. Correspondingly, the lower rollers 10 are raised as compared with the state in FIG. 2. Furthermore, the locations at which the weld seams 14 between metal strips 1*a* and 1*b* and metal strips 1*b* and 1*c* are located have changed.

Similarly, a period of time is also required to form the weld seam 14 between metal strips 1*c* and 1*d*—illustrated in FIG. 4. During this period of time too, the continuous strip is conveyed out of the strip accumulator 8 and, in association therewith, the continuous strip is fed to the processing device 11. In comparison with the state illustrated in FIG. 3, the location of the strip tail 3*c* has, as before, not changed. As a result of the continuous strip being conveyed out of the strip accumulator 8, however, the degree of filling of the strip accumulator 8 has been reduced even further. Correspondingly, the lower rollers 10 are raised even further as compared with the state in FIG. 2. Moreover, the locations at which the weld seams 14 between metal strips 1*a* and 1*b* and metal strips 1b and 1c are located have once again changed as compared with the state in FIG. 3.

A certain period of time is also required for the feeding of the strip tail 3c of metal strip 1c and the strip head 2d and the fillet piece 4d of metal strip 1d to the strip accumulator 8. The locations at which the weld seams 14 between metal strips 1a and 1b and metal strips 1b and 1c are located have thus changed again. However, the feeding of the strip tail 3c of metal strip 1c as well as of the strip head 2d and of the fillet piece 4d of metal strip 1d to the strip accumulator 8 takes place at a higher speed than the discharge of the continuous strip from the strip accumulator 8. Thus, owing to the feeding of the strip tail 3c of metal strip 1c and the strip head 2d and the fillet piece 4d of metal strip 1d to the strip accumulator 8, the degree of filling of the strip accumulator 8 is increased in spite of the simultaneous discharge of the continuous strip from the strip accumulator 8. Correspondingly, the lower rollers 10 are lowered in comparison with the state in FIG. 4, generally to the same or at least a similar level as in FIG. 2.

Analogously to the feeding of the metal strips 1 to the strip accumulator 8—as an entirely natural result—each metal strip 1 is, as can be seen, fed first with its strip head 2, then with its fillet piece 4 and finally with its strip tail 3 to the processing device 11.

The configuration of the weld seam 14 between metal strips 1c and 1d is explained below in conjunction with FIG. 6. However, the corresponding statements also apply 1:1 to the weld seams 14 between other metal strips 1.

Figure 6:
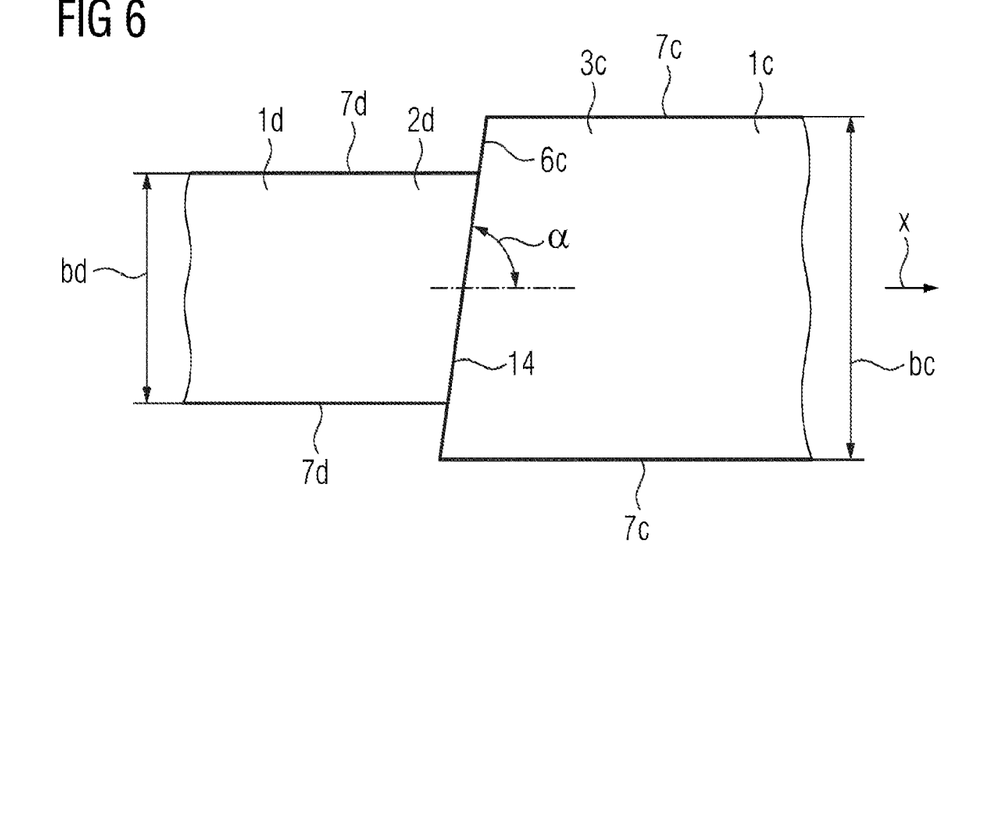
FIG. 6 shows a plan view of a weld seam.

As a rule, the metal strips 1c, 1d are placed against one another centrally as shown in FIG. 6. In this case, the weld seam 14 extends from the lateral edge 7c, 7d of one of the two metal strips 1c, 1d to the other lateral edge 7c, 7d of the same metal strip 1c, 1d, irrespective of whether the metal strips 1c, 1d have the same strip width bc, bd or strip widths bc, bd which are different from one another. This case can also occur in the event of eccentric connection of the metal strips 1c, 1d. In the case of eccentric connection of the metal strips 1c, 1d, however, it is possible for the weld seam 14 to extend from the lateral edge 7c, 7d of one of the two metal strips 1c, 1d to a lateral edge 7d, 7c of the other metal strip 1d, 1c. Irrespective of whether one or the other case is implemented, however, an angle α which the weld seam 14 forms with the transport direction x differs, at least in some section or sections, from 90°. The welding machine 12 is designed in such a way that it can form this weld seam 14, and is also operated in this way.

The extent to which the angle α differs from 90° can be determined as required. For example, the deviation from 90° can be about 5° to 10°, in particular between 6° and 8°.

The welding operation as such and also the preparation of the leading edge 5 of one metal strip 1 and of the trailing edge 6 of the other metal strip 1 need not be explained in greater detail.

Figure 7:
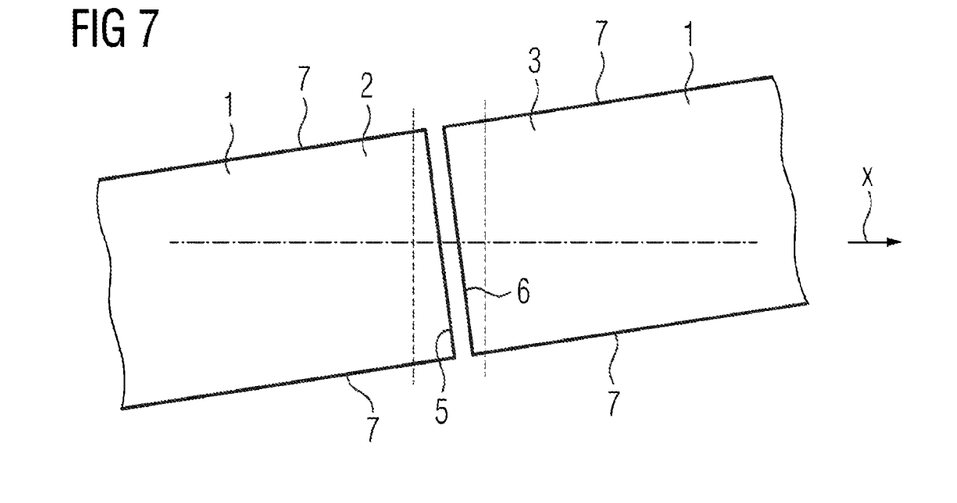
FIG. 7 shows a plan view of two metal strips before welding.

Specifically for a diagonal profile of the weld seam 14, it is furthermore possible, by clamping corresponding regions of the strip head 2 of one metal strip 1 and of the strip tail 3 of the other metal strip 1 and forming loops, for the metal strips 1 to run obliquely at the angle α in the welding machine 12. FIG. 7 shows this state of the metal strips 1. In this state, the leading edge 5 of one metal strip 1 and the trailing edge 6 of the other metal strip 1 can then be prepared in a completely conventional manner. The cutting-off—indicated in FIG. 7 by dashed lines—can likewise be carried out in a completely conventional manner orthogonally to the transport direction x. The welding can also take place in a manner which is likewise completely conventional and orthogonal to the transport direction x. Owing to the fact that the strip head 2 of one metal strip 1 and the strip tail 3 of the other metal strip 1 run obliquely at the angle α during the welding operation but align themselves again in the transport direction x after welding (see FIG. 6), the weld seam 14 runs at the angle α after welding.

The present invention has many advantages. In particular, due to the profile of the weld seams 14, the processing device 11 does not act on the weld seams 14 over the entire width of the weld seams 14 at a particular time, but only over a partial region in each case. As a result, only a partial region of the respective weld seam 14 is subjected to processing at any one point in time. Particularly in stretcher levelers and rolling mills, it is no longer necessary to vary the processing process for the weld seams 14. Off-gage lengths which have to be segregated out as scrap can thereby be reduced. The yield can thus be increased. The risk of strip tearing can be reduced to almost zero. A further positive effect is that maintenance intervals of the welding machine 12 can be increased and the maintenance of the welding machine 12 is also simplified. Downtimes of the processing plant can thereby be reduced, which likewise increases productivity. Furthermore, it is also possible to retrofit conventional welding machines 12 correspondingly in such a way that they can produce a diagonal profile of the weld seam 14.

Although the invention has been illustrated and described more specifically in detail by means of the preferred exemplary embodiment, the invention is not restricted by the examples disclosed, and other variants can be derived therefrom by a person skilled in the art without exceeding the scope of protection of the invention.

LIST OF REFERENCE SIGNS 1 metal strips
2 strip heads
3 strip tails
4 fillet pieces
5 leading edges
6 trailing edges
7 lateral edges
8 strip accumulator
9 upper rollers
10 lower rollers
11 processing device
12 welding machine
13 uncoiler
14 weld seams
b strip widths
x transport direction
α angle

The invention claimed is:

1. A processing method for processing metal strips in a processing plant, the processing plant including an accumulator, a welding machine upstream of the accumulator, and a processing device downstream of the accumulator, the method comprising:
    feeding a first metal strip to the welding machine and toward the strip accumulator in a transport direction (x), the first metal strip having a strip head with a leading edge, a strip tail with a trailing edge, and a fillet piece between the strip head and the strip tail thereof,
    feeding a second metal strip to the welding machine and toward the strip accumulator in the transport direction (x) while at least the strip tail of the first metal strip is in the welding machine, the first metal strip having a strip head with a leading edge, a strip tail with a trailing edge, and a fillet piece between the strip head and the strip tail thereof, inside the welding machine, rotating the first metal strip and the second metal strip so that the first and the second metal strip are oriented in a direction that is at an oblique angle ($\alpha$) to the transport direction (x), inside the welding machine, cutting through the strip head of the rotated second metal strip and the strip tail of the rotated first metal strip along a direction that is perpendicular to the transport direction (x), thereby creating a new leading edge for the strip head of the second metal strip and a new trailing edge of the strip tail of the first metal strip, inside the welding machine, welding the new leading edge of the strip head of the second metal strip to the new trailing edge of the strip tail of the first metal strip to obtain a weld seam, wherein, when viewed transversely to the transport direction (x), the weld seam extends from a first lateral edge that runs along the transport direction (x) of one of the two metal strips to a second lateral edge thereof, storing the welded first and second metal strips in the strip accumulator, and feeding the welded first and second metal strips continuously or intermittently from the strip accumulator to the processing device, wherein first the strip heads, then the fillet pieces, and only then the strip tails of the first and second welded metal strips are fed to the processing device.

2. The processing method as claimed in claim 1, wherein the first metal strip and the second metal strip are rotated by forming loops in the first metal strip and the second metal strip.

3. The processing method as claimed in claim 1, wherein the processing device is designed as a rolling mill having at least one roll stand, in that the metal strips are rolled with a respective compressed length in the roll stands of the processing device, and in that a longitudinal extent which the weld seam has, when viewed in the transport direction (x), before rolling in the respective roll stand, is greater than the respective compressed length.

4. The processing method as claimed in claim 1, wherein the oblique angle ($\alpha$) is approximately 5° to 10° from 90°.

5. The processing method as claimed in claim 1, wherein the processing device is designed as a rolling mill having at least one roll stand.

6. The processing method as claimed in claim 1, wherein the oblique angle ($\alpha$) is 6° to 8° from 90°.

* * * * *